Nov. 21, 1950   J. B. JOHNSTON   2,531,219
WALLPAPER PASTING AND TRIMMING MACHINE
Filed Dec. 31, 1947   7 Sheets-Sheet 4

INVENTOR.
JOSEPH B. JOHNSTON.
BY
ATTORNEY.

Nov. 21, 1950  J. B. JOHNSTON  2,531,219
WALLPAPER PASTING AND TRIMMING MACHINE
Filed Dec. 31, 1947  7 Sheets-Sheet 6

INVENTOR.
JOSEPH B. JOHNSTON.
BY
ATTORNEY.

Patented Nov. 21, 1950

2,531,219

UNITED STATES PATENT OFFICE 2,531,219

WALLPAPER PASTING AND TRIMMING MACHINE

Joseph B. Johnston, Denver, Colo.

Application December 31, 1947, Serial No. 795,018

7 Claims. (Cl. 91—14)

This invention relates to a machine for preparing strips of wall paper for hanging, and has for its principal object the provision of a single, unitary device which will cut wall paper into pre-set lengths, trim the edges thereof, and apply paste to the back so as to produce strips completely prepared for immediate hanging on the wall.

Another object of the invention is to so construct the device that it will be readily and quickly adjustable to produce different widths and lengths of pasted strips.

Other objects and advantages reside in the detail construction of the invention, which is designed for simplicity, economy, and efficiency. These will become more apparent from the following description.

In the following detailed description of the invention, reference is had to the accompanying drawing which forms a part hereof. Like numerals refer to like parts in all views of the drawing and throughout the description.

Figure 8:
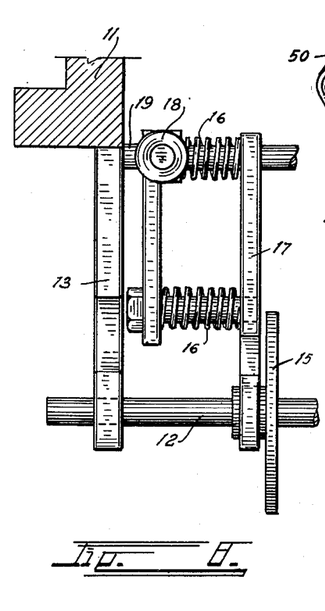
Fig. 8 is a fragmentary, detail view, illustrating the paper roll hanger employed in the improved machine.
Figure 9:
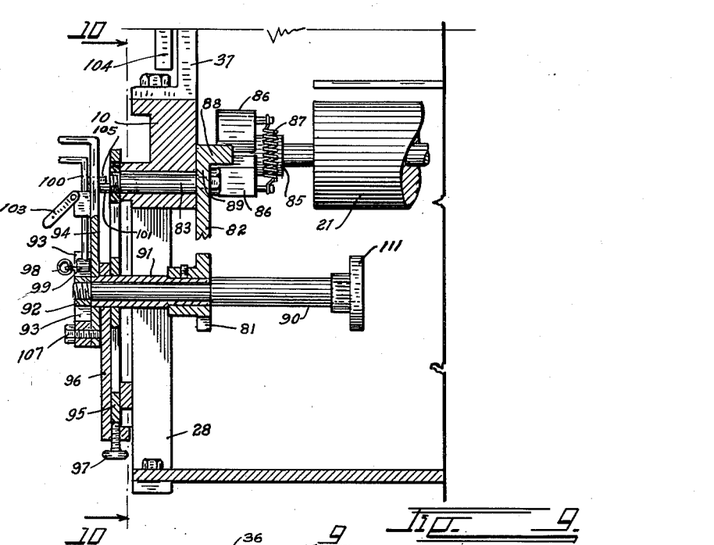
Fig. 9 is an enlarged detail section taken on the line 9—9, Fig. 3 and 10.
Figure 10:
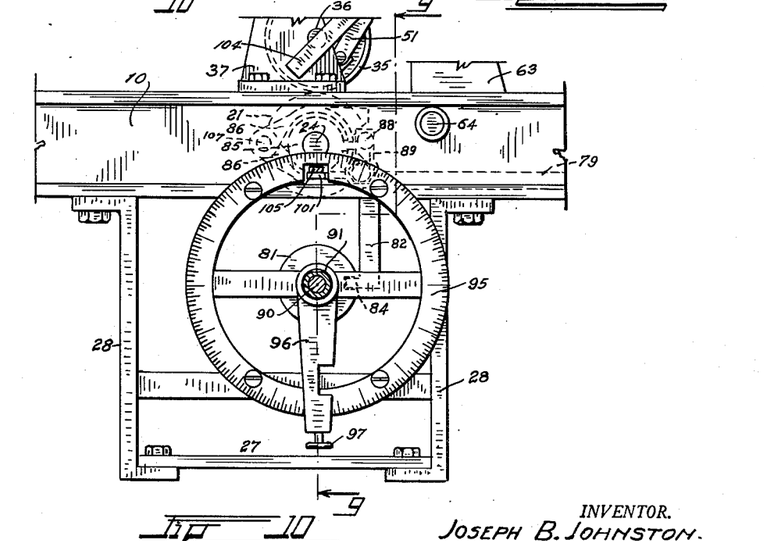
Fig. 10 is a similar section taken on the line 10—10, Fig. 9.

The invention is supported on two side frames 10 and 11 which can be supported from the floor in any desired manner. The two side frames 10 and 11 are maintained in parallel spaced relation by means of cross bars 33. The roll of paper to be prepared is carried on a roll shaft 12 suspended in hangers 13 below one end of the side frames 10 and 11. The roll shaft 12 passes through the roll of paper and the latter abuts against a fixed end flange 14 at one extremity, and is clamped against the latter flange by means of a movable flange 15 which is constantly urged toward the flange 14 by means of suitable compression springs 16 (see Fig. 8) which act against a pusher yoke 17 rotatably connected with the flange 15. The position of the flange 15 and the yoke 17 can be adjusted by means of a set screw 18 which locks against a spring rod 19 extending between the side frames 10 and 11.

The paper from the roll is led upwardly onto an endless flexible conveyor belt 20 which is stretched between two belt rollers 21. One of the rollers 21 is mounted upon an adjustable shaft 22 which can be moved longitudinally of the frames 10 and 11 by means of tension adjusting screws 23 to adjust the tension in the conveyor belt. The other conveyor roller is mounted upon a conveyor drive shaft 24 which is driven from a countershaft 25 through the medium of a transmission chain 26.

The countershaft is driven from any suitable motor or engine (not shown), a motor plate 27 being suspended below the side frames 10 and 11 upon suitable hangers 28 to support the drive motor or engine.

The paper is pressed against the conveyor 20 to obtain traction thereon by means of a press roller 29 which is mounted in vertically elongated bearing openings 30 in side roller brackets 31 mounted on the frames 10 and 11. The press roller may be manually rotated to feed the paper into the machine by means of a hand crank 32. The cross bars 33 support a top plate 34 which overlies the paper on the conveyor 20. As the paper passes over the drive shaft 24, its upper or back side is covered with paste by means of a pasting roller 35 which is mounted on a paste roll shaft 36 extending between side brackets 37 attached upon the side frames 10 and 11.

Paste is supplied to the surface of the roller 35 by means of an intermediate roller 38 which rides against a paste pick-up roller 39. The roller 39 rotates partially submerged in a paste tray 40. The paste is supplied to the tray 40 from any suitable exterior paste reservoir, such as indicated in broken line at 41.

The intermediate roller 38 is mounted on an intermediate shaft 42, and the paste roller 39 is mounted on a paste pick-up shaft 43. The paste roll shaft 36 is mounted in swinging brackets 44. Each of the brackets 44 is swingingly mounted on a hinge pin 45 on one of the side brackets 37 so that the pasting roller 35 rests by gravity on the paper. The pasting roller 35 may be manually rotated by means of a hand wheel 109 when preparing the machine for operation.

The intermediate shaft 42 is mounted at each extremity in a L-shaped lever bracket 46. Each of the brackets 46 is tiltably mounted upon a pivot screw 47 on each of the brackets 37. This allows the roller 38 to rest by gravity against the rollers 35 and 39. The brackets 46 can be forced forwardly by means of adjustment screws 48 so that the space between the rollers 38 and 39 may be varied to pick up any desired amount of paste. The L-shaped lever brackets 46 at the opposite sides of the machine are connected together to move in unison by means of a cross tie rod 110. The brackets 46 and the weight of the roller 38 is resiliently supported upon tension springs 49.

The L-shaped lever brackets 46 are provided with crank arms 50 which are connected by means of connecting rods 51 with the swinging brackets 44 so that movements of the L-shaped lever brackets 46 are transmitted to the swinging brackets 44 so that an adjustment of the relation between all of the pasting rollers can be accomplished simultaneously by adjusting the screws 48.

Surplus paste on the paste pick-up roller 39 can be removed and the roller cleaned by means of a squeegee 52 operated from a manual squeegee handle 53. Surplus paste at the extremities of the pasting roller 35 can be removed by means of two adjustable squeegees 54 which are adjustable along a squeegee rod 106 to provide a paste width equal to the width of the paper being worked upon.

The pasting roller 35 is driven from its frictional contact with the traveling paper, causing it to rotate the shaft 36. The shaft 36 carries a drive gear 55 which meshes with a reverse gear 56 mounted on the hinge bolt 45. The reverse gear 56 drives a driven gear 57 mounted on the shaft 42 of the intermediate roller 38 so as to positively rotated the rollers 35 and 38 in the same direction so that the rollers wipe against each other to properly spread the paste. The paste pick-up shaft 43 is driven by means of a drive chain 58 extending between a sprocket 59 on the pasting roll shaft 36 and a sprocket 60 on the paste pick-up shaft 43. The shaft 43 is mounted in suitable bearing brackets 61 from the side members 10 and 11.

The two edges of the paper, after leaving the paste roller 35, enter between rotary shears 62, there being one pair of rotary shears adjacent each edge of the paper. The shears 62 are carried in a shear frame 63 which is slidable along a shear shaft 64 and a guide rod 65. The frames 63 may be moved to any desired position by means of suitable set screws 66.

The upper rotary shear 62 of each set is mounted on a hub 67 rotatable upon a stationary stub shaft 68. The hub 67 is rotated through the medium of drive gears 69 from a drive hub 70 which is keyed to the shaft 64 in an elongated keyway 71. The shaft 64 is driven from the shaft 24 through the medium of an endless chain 72.

Thus it can be seen that the rotary shears 62 are positively driven at any desired spaced setting. The lower rotary shear 62 is constantly urged against the side of the upper shear by means of a compression spring 73 surrounding the shaft 64 and acting against an abutment 74 on the frame 63. Thus it can be seen that the two edges of the paper are continually sheared as the paper passes through the machine.

The paper is supported as it passes through the rotary shears by means of a telescoping apron 108 formed in two parts which slide over each other as the two shear frames 63 are adjusted toward or away from each other. The apron 108 guides the paper over a lower, stationary cutting blade 75 against which a movable cutting blade 76 reciprocates to cut the paper strips to desired lengths. The blade 76 is swingingly mounted on connecting links 77 so that it may swing back and forth with an up-and-down motion. It is constantly pulled downwardly by means of a shearing spring 78 and may be lifted upwardly by means of an operating handle 79. A lift link 80 extends from the operating handle upwardly to the blade 76 to lift the latter.

Therefore, when the handle 79 is lifted, the paper can pass beneath the blade 76, and when the handle is released the spring 78 pulls the blade 76 downwardly to cut off the paper. The blade 76 is prevented from descending until a predetermined length of paper has passed beneath the blade 76 by means of a notched measuring cam 81, in the notch of which a fianger 84 on a stop arm 82 enters. The stop arm 82 is formed integrally with the operating handle 79, and both are secured on a rotatable pivot shaft 83.

Therefore, when the cam 81 has rotated sufficiently to place its notch beneath the finger 84 the latter will enter the notch allowing the knife 76 to drop. The machine then remains stationary until the handle 79 is again lifted.

In order to prevent the machine from coasting after the paper has been cut, a brake drum 85 is mounted on the conveyor drive shaft 24 which can be clutched between two brake shoes 86, having wedge-shaped extremities. The shoes 86 are constantly urged together by means of a tension spring 87. The brake shoes may be separated by means of a wedge pin 88 mounted on a lever 89 which is fixedly mounted on the shaft 83. Thus, when the handle 79 is lifted, the wedge pin will enter between the wedge-shaped extremities on the brake shoes 86, releasing the brake. When the finger 84 drops into its notch, the wedge pin 88 will move outwardly from the latter extremities, to the position of Fig. 4, allowing the spring 87 to instantly apply braking action to the shaft 24.

The length of each strip cut from the roll can be pre-set by means of the following mechanism. The measuring mechanism is driven from a measuring shaft 90. One extremity of the shaft 90 is reduced in diameter and passes through a rotatable sleeve 91 which carries the notched cam 81. The extremity of the shaft 90 projects through the end of the sleeve 91, terminating in a clutch drum 92. The sleeve 91 can be caused to rotate with the shaft 90 by the engagement of two clutch shoes 93 with the drum 92. The clutch shoes are hingedly mounted on a pin 107 on a measuring arm 94.

A measuring dial 95 is mounted on one side of the machine and divided into graduations of feet and inches. A pre-setting arm 96 is rotatably mounted on the sleeve 91 so that it may swing around the circumference of the measuring dial 95, and set in any desired position thereon by means of a set screw 97.

The clutch jaws 93 are constantly urged to grip the drum 92 by means of a clutch spring 98, and can be separated from the drum 92 by means of a separating boss 99 mounted on a slide 100 slidably mounted on the measuring arm 94. Thus, when the slide 100 is pulled away from the axis of the drum 92, the boss 99 will slide between the clutch members 93 and separate them to release the drum 92.

Figure 4:
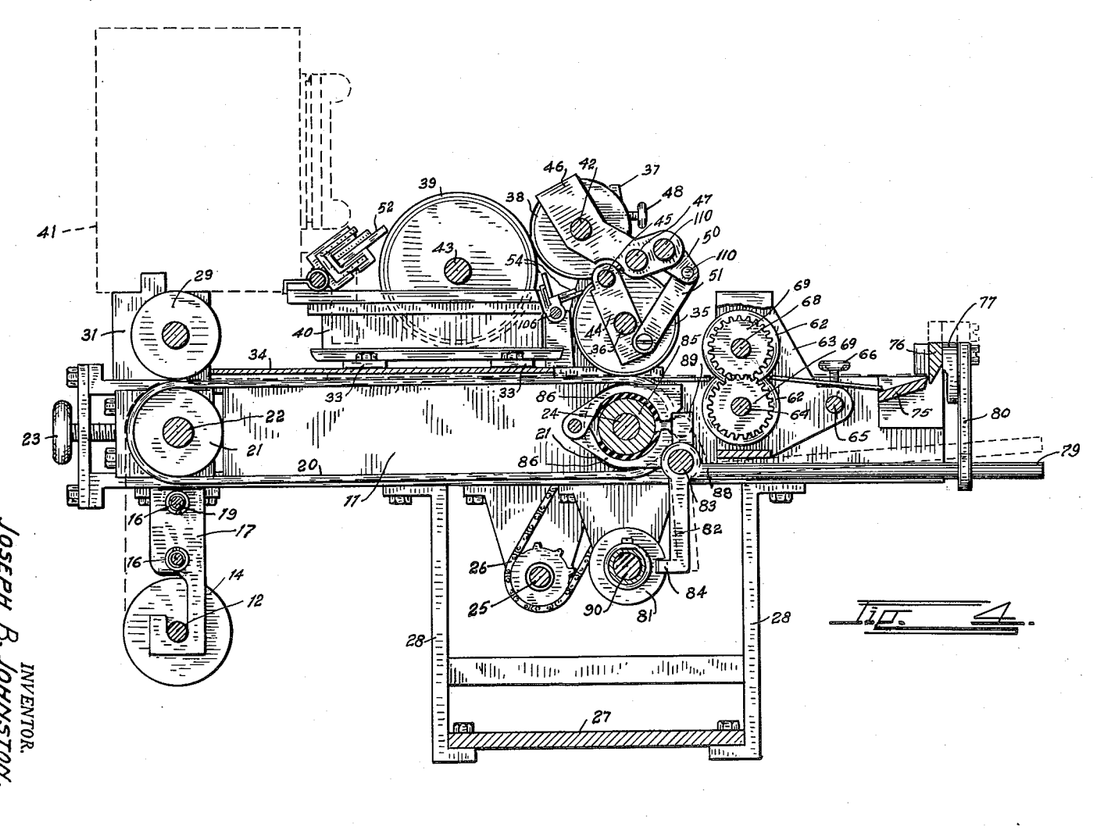
Fig. 4 is a longitudinal section, taken on the line 4—4, Fig. 1.
Figure 5:
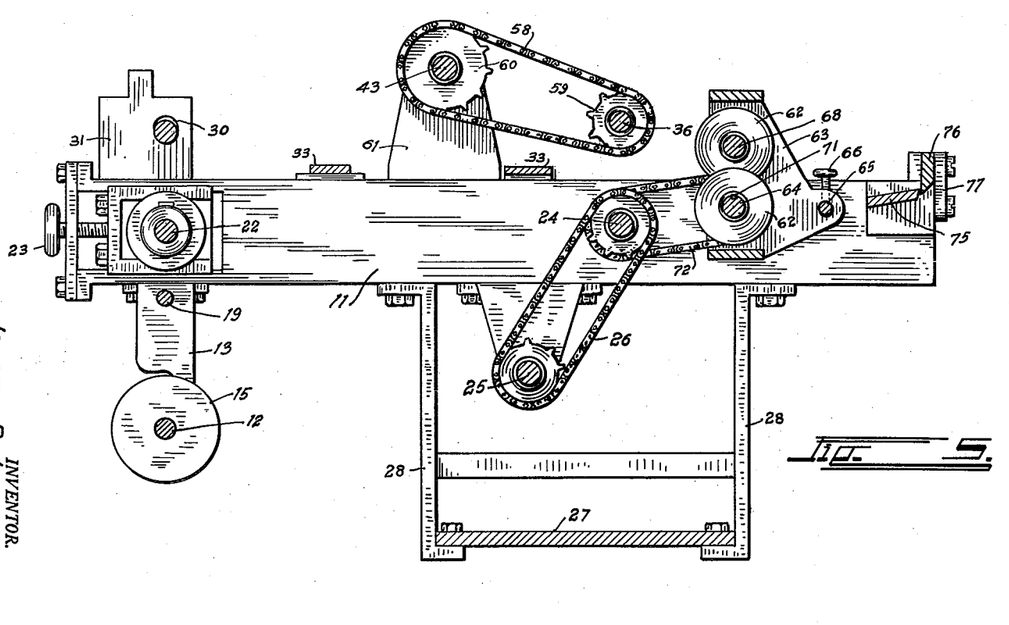
Fig. 5 is a similar section, taken on the line 5—5, Fig. 1.
Figure 6:
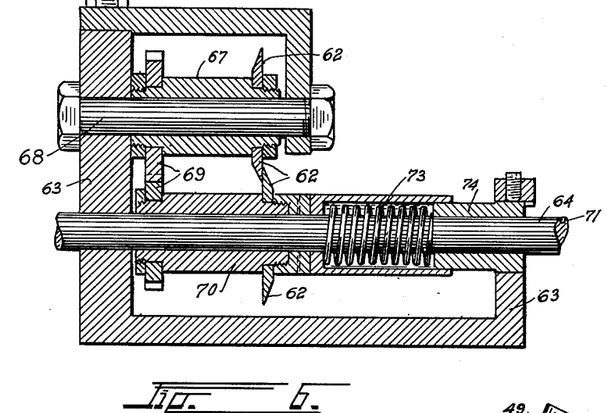
Fig. 6 is a still further enlarged detail section, taken on the line 6—6, Fig. 1, illustrating the operation of the trimming knives employed in the improved machine.
Figure 7:
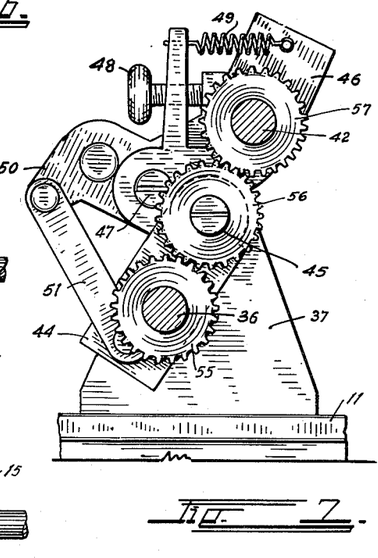
Fig. 7 is an enlarged, fragmentary, detail section, taken on the line 7—7, Fig. 1.

The slide 100 is initially lifted by means of a lift lever 101 mounted on the pivot shaft 83 which engages a lifting arm 105 so that when the handle 79 is dropped to the solid line position of Fig. 4, the slide 100 will be lifted. The measuring shaft 90 is driven from a drive chain 102 leading from the shaft 24.

Figure 1:
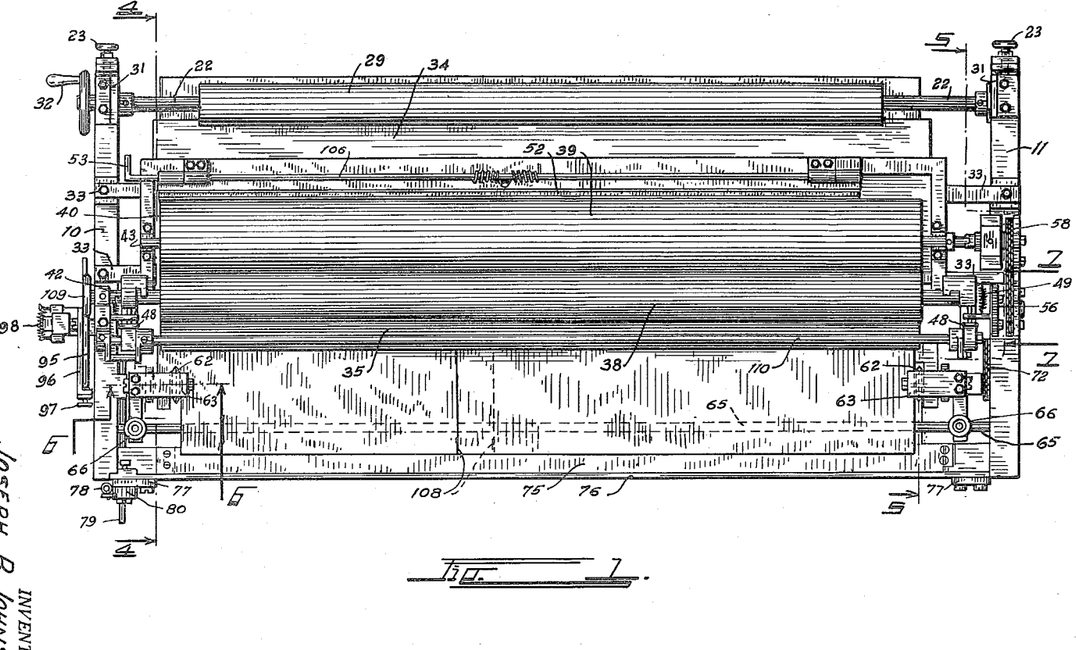
Fig. 1 is a plan view of the improved wall paper cutting, trimming, and pasting machine.
Figure 2:
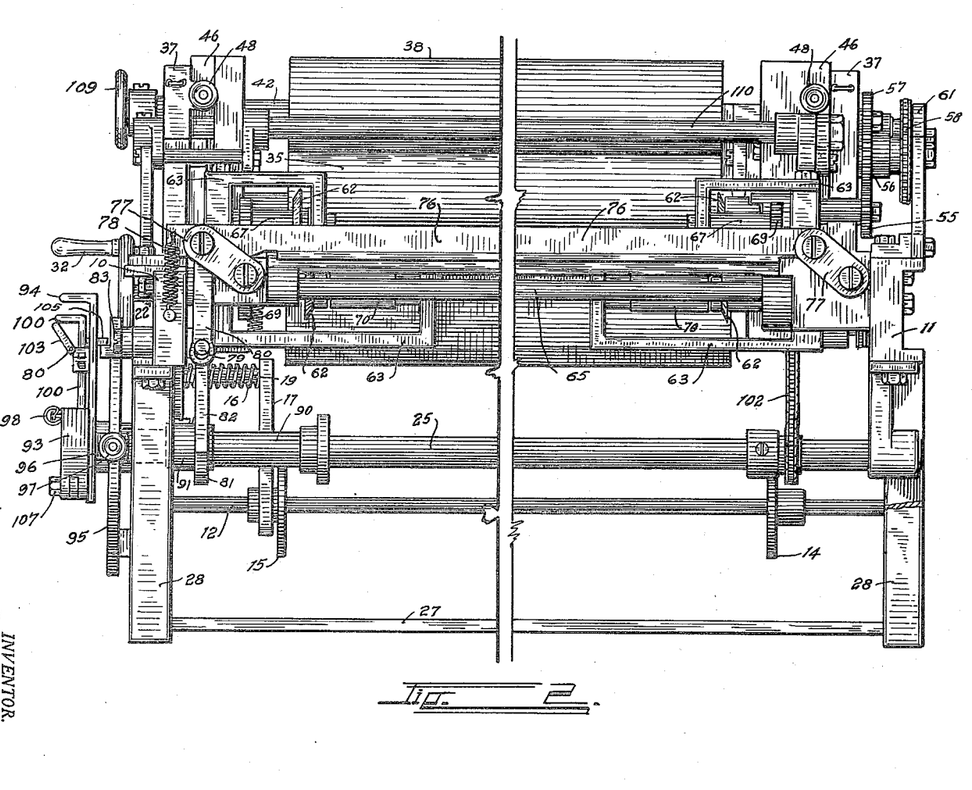
Fig. 2 is an enlarged, fragmentary view of the delivery end of the machine.
Figure 3:
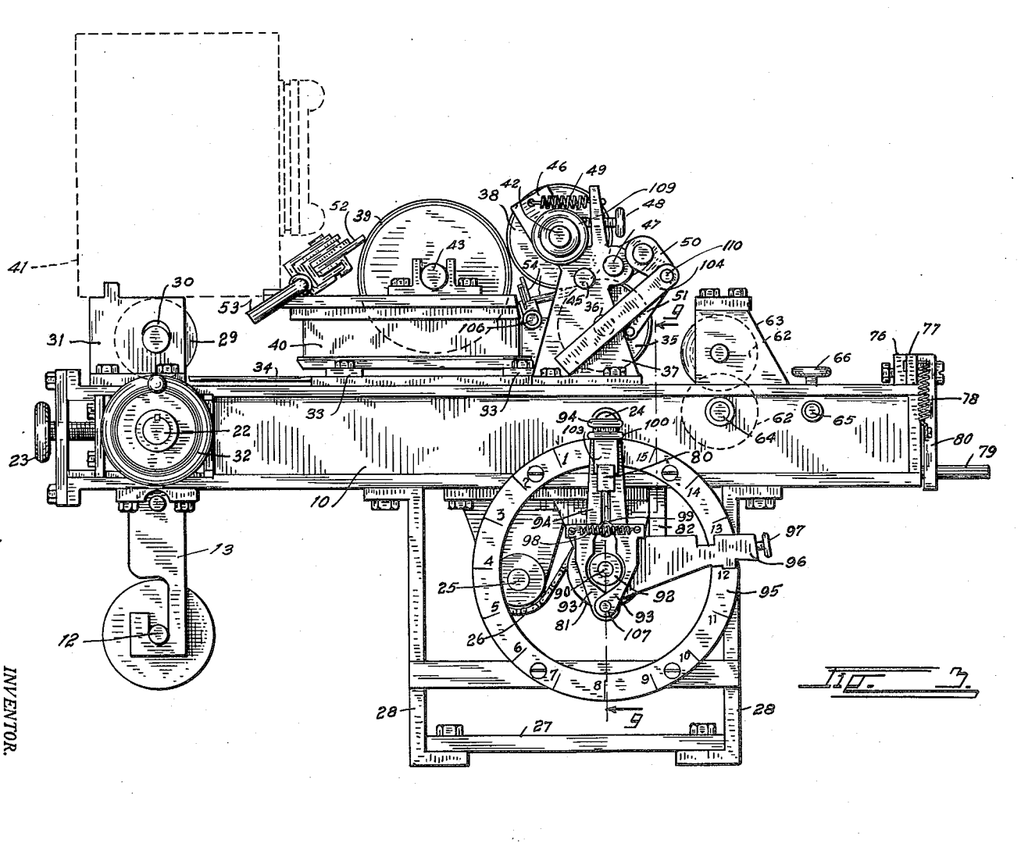
Fig. 3 is a similarly enlarged side view thereof.

The operation of the device is as follows. Let us assume that strips of paper twelve feet long are desired. The pre-setting arm 96 is set at the 12 foot designation on the dial 95 by means of the set screw 97. The operating lever 79 is lifted, this acts through the lever arm 101 to cause the clutch shoes 93 to grip the drum 92. The measuring arm 94 is now rotated counter-clockwise in Fig. 3 until it strikes the pre-setting arm 96. This rotates the notched cam in the same direction. The surface of the cam 81 will be supporting the operating handle 79 in the raised position. The machine is now started, and the operating arm 94 begins to rotate in a clockwise direction, and since it is clutched to the cam 81, it also rotates in a clockwise direction. This continues until the operating arm 94 reaches the vertical position of Fig. 3, at which time the finger 84 will drop into the notch of the cam, allowing the operating handle 79 to fall.

The dropping of the operating arm 79 accomplishes several functions. First, it allows the knife 76, to fall, cutting the paper. Second, it applies the brake shoes 86, stopping the advance of the paper. Third, it acts through the arm 101 to lift the boss 99 and release the clutch shoes 93, putting the measuring device out of operation until the next strip is desired.

Should it not be desired to use the measuring device, it may be disconnected by swinging a latch member 103 upwardly under the slide 100 to support the slide 100 and the boss 99 in the elevated released position. The pasting roller 35 may be supported out of contact with the paper for adjusting and preparing the machine, and when pasting is not desired, by means of a leg 104 which can be swung to support the cross tie rod 110 and the lever brackets 46 from the side frame 14.

While a specific form of the improvement has been described and illustrated herein, it is desired to be understood that the same may be varied, within the scope of the appended claims, without departing from the spirit of the invention.

Having thus described the invention, what is claimed and desired secured by Letters Patent is:

1. A machine for cutting, trimming, and pasting wall paper strips, comprising: an elongated, horizontal frame; a pair of parallel, horizontal conveyor rollers supported in spaced relation in said frame; an endless conveyor belt mounted to travel with said rollers; means for supporting a roll of wall paper below one extremity of said conveyor belt so that the paper may extend upwardly over and along the belt; means for holding said paper in contact with said belt so that it will travel therewith; means for applying paste to the upper surface of said paper as it travels with said belt; a transversally extending cutting knife extending across said paper for severing the paper into strips; a spring urging said cutting knife toward said paper; a lever supporting said knife over said paper; cam means for releasing said lever after a predetermined length of travel of said paper to allow said spring to actuate said knife; a clutch transmitting power to said cam means; means for releasing said clutch when said knife has engaged said paper so as to stop actuation of said cam; braking means for stopping the travel of said conveyor belt; and means actuated in consequence of the dropping of said knife for applying said braking means.

2. A machine for cutting, trimming, and pasting wall paper strips, comprising: an elongated, horizontal frame; a pair of parallel, horizontal conveyor rollers supported in spaced relation in said frame; an endless conveyor belt mounted to travel with said rollers; means for supporting a roll of wall paper below one extremity of said conveyor belt so that the paper may extend upwardly over and along the belt; means holding the paper in frictional contact with said belt; means supplying paste to said paper; a vertically movable cutting knife extending across said paper; a measuring shaft driven from said conveyor rollers; a notched cam rotatably mounted on said measuring shaft; means for manually rotating said notched cam rearwardly a predetermined distance; clutching means for clutching said cam to said measuring shaft so that it will rotate forwardly therewith said predetermined distance; and means operable from said cam for severing said paper at the termination of said predetermined distance.

3. A machine for cutting, trimming, and pasting wall paper strips, comprising: an elongated, horizontal frame; a pair of parallel, horizontal conveyor rollers supported in spaced relation in said frame; an endless conveyor belt mounted to travel with said rollers; means for supporting a roll of wall paper below one extremity of said conveyor belt so that the paper may extend upwardly over and along the belt; means holding the paper in frictional contact with said belt; means supplying paste to said paper; a vertically movable cutting knife extending across said paper; a measuring shaft driven from said conveyor rollers; a notched cam rotatably mounted on said measuring shaft; means for manually rotating said notched cam rearwardly a predetermined distance; clutching means for clutching said cam to said measuring shaft so that it will rotate forwardly therewith said predetermined distance; a pivoted stop arm adjacent said cam; a finger on said stop arm adapted to enter a notch in said cam; an operating handle extending from said stop arm; and means connected with said operating handle for supporting said cutting knife so that when said finger enters the notch of said cam, said cutting knife will be dropped on said paper to sever the latter.

4. A machine for cutting, trimming, and pasting wall paper strips, comprising: an elongated, horizontal frame; a pair of parallel, horizontal conveyor rollers supported in spaced relation in said frame; an endless conveyor belt mounted to travel with said rollers; means for supporting a roll of wall paper below one extremity of said conveyor belt so that the paper may extend upwardly over and along the belt; means holding the paper in frictional contact with said belt; means for supplying paste to said paper; a vertically movable cutting knife extending across said paper; a measuring shaft driven from said conveyor rollers; a notched cam rotatably mounted on said measuring shaft; means for manually rotating said notched cam rearwardly a predetermined distance; clutching means for clutching said cam to said measuring shaft so that it will rotate forwardly therewith said predetermined distance; a pivoted stop arm adjacent said cam; a finger on said stop arm adapted to enter a notch in said cam; an operating handle extending from said stop arm; means connected with said operating handle for supporting said cutting knife so that when said finger enters the notch of said cam, said cutting knife will be dropped on said paper to sever the latter; and means operable in consequence of the dropping of said operating lever for releasing said clutching means.

5. A machine for cutting, trimming, and pasting wall paper strips, comprising: an elongated, horizontal frame; a pair of parallel, horizontal conveyor rollers supported in spaced relation in said frame; an endless conveyor belt mounted to travel with said rollers; means for supporting a roll of wall paper below one extremity of said conveyor belt so that the paper may extend upwardly over and along the belt; a pressing roller mounted for holding the paper in frictional contact with said belt; a pasting roller mounted for rolling on said paper over said belt; means for supplying paste to said pasting roller; a pair of trimming knives positioned at each side of said paper for trimming the edges therefrom as it passes; a measuring shaft driven from said conveyor rollers; a notched cam rotatably mounted on said measuring shaft; means for manually rotating said notched cam rearwardly a predetermined distance; clutching means for clutching said cam to said measuring shaft so that it will rotate forwardly therewith said predetermined distance; a pivoted stop arm adjacent said cam; a finger on said stop arm adapted to enter a notch in said cam; an operating handle extending from said stop arm; means connected with said operating handle for supporting said cutting knife so that when said finger enters the notch of said cam, said cutting knife will be dropped on said paper to sever the latter; means operable in consequence of the dropping of said operating lever for releasing said clutching means; a brake for resisting rotation of said conveyor rollers; and means operable in consequence of the lifting of said operating lever for releasing said brake.

6. A machine for cutting, trimming, and pasting wall paper strips, comprising: an elongated, horizontal frame; a pair of parallel, horizontal conveyor rollers supported in spaced relation in said frame; an endless conveyor belt mounted to travel with said rollers; means for supporting a roll of wall paper below one extremity of said conveyor belt so that the paper may extend upwardly over and along the belt; roller brackets extending upwardly from said frame; a pressing roller mounted in said roller brackets and holding the paper in frictional contact with said belt; side brackets extending upwardly from said frame; a pasting roller supported from said side brackets and rolling on said paper over said belt; means for supplying paste to said pasting roller; a transversally extending cutting knife extending across said paper for severing the paper into strips; a spring urging said cutting knife toward said paper; a lever supporting said knife over said paper; a cam for releasing said lever; a measuring shaft driven from said conveyor rollers; and means for adjusting and clutching said cam to said measuring shaft at any desired position so that it will act to release said lever after a predetermined length of travel of said paper to allow said spring to actuate said knife.

7. A machine for cutting, trimming, and pasting wall paper strips, comprising: an elongated, horizontal frame; a pair of parallel, horizontal conveyor rollers supported in spaced relation in said frame; an endless conveyor belt mounted to travel with said rollers; means for supporting a roll of wall paper below one extremity of said conveyor belt so that the paper may extend upwardly over and along the belt; means holding said paper in contact with said belt so that it will travel therewith; means for applying paste to the upper surface of said paper as it travels with said belt; a transversally extending cutting knife extending across said paper for severing the paper into strips; a spring urging said cutting knife downwardly toward said paper; a lever supporting said knife over said paper; a cam; a stop arm extending from said lever and bearing against said cam to support said lever and said knife; a notch in said cam into which said arm may enter to allow said knife to fall and cut said paper; a measuring shaft driven from said conveyor rolls; a clutch for connecting said cam to said measuring shaft at any desired radial position so that said notch will reach said arm to release the latter after any preselected circumferential rotation; and means for releasing said clutch when said arm enters said notch.

JOSEPH B. JOHNSTON.

REFERENCES CITED

The following references are of record in the file of this patent:

UNITED STATES PATENTS

| Number | Name | Date |
|---|---|---|
| 458,259 | Floring et al. | Aug. 25, 1891 |
| 472,286 | Clause | Apr. 5, 1892 |
| 834,087 | Vogt | Oct. 23, 1906 |
| 1,065,376 | Leitgeb | June 24, 1913 |
| 1,095,142 | Crowell | Apr. 28, 1914 |
| 1,122,122 | Jatko | Dec. 22, 1914 |
| 1,267,517 | Crowell | May 28, 1918 |
| 1,284,289 | Foote | Nov. 12, 1918 |
| 1,960,945 | Krueger | May 29, 1934 |
| 2,083,219 | Clements et al. | June 8, 1937 |
| 2,247,447 | Manko | July 1, 1941 |
| 2,373,644 | Belch | Apr. 17, 1945 |